United States Patent
Peters

(10) Patent No.: US 11,373,288 B2
(45) Date of Patent: Jun. 28, 2022

(54) APPARATUS FOR PLANT MANAGEMENT

(71) Applicant: BASF SE, Ludwigshafen am Rein (DE)

(72) Inventor: Ole Peters, Langenfeld (DE)

(73) Assignee: BASF SE, Ludwigshafen am Rhein (DE)

( * ) Notice: Subject to any disclaimer, the term of this patent is extended or adjusted under 35 U.S.C. 154(b) by 67 days.

(21) Appl. No.: 16/755,984

(22) PCT Filed: Oct. 19, 2018

(86) PCT No.: PCT/EP2018/078758
§ 371 (c)(1),
(2) Date: Apr. 14, 2020

(87) PCT Pub. No.: WO2019/081375
PCT Pub. Date: May 2, 2019

(65) Prior Publication Data
US 2020/0242754 A1    Jul. 30, 2020

(30) Foreign Application Priority Data

Oct. 27, 2017   (EP) ..................................... 17198812
Oct. 27, 2017   (EP) ..................................... 17198814

(51) Int. Cl.
*G06T 7/00*       (2017.01)
*A01M 7/00*      (2006.01)
(Continued)

(52) U.S. Cl.
CPC ......... *G06T 7/0004* (2013.01); *A01M 7/0089* (2013.01); *G06Q 50/02* (2013.01); *G06V 20/188* (2022.01); *G06T 2207/30188* (2013.01)

(58) Field of Classification Search
CPC ........ G06T 7/0004; G06T 2207/30188; G06K 9/00657; G06Q 50/02; A01M 7/0089
(Continued)

(56) References Cited

U.S. PATENT DOCUMENTS 10,537,071 B2 *  1/2020  Redden ................. A01G 22/20
2003/0028321 A1  2/2003  Upadhyaya et al.
(Continued)

FOREIGN PATENT DOCUMENTS

CN      103523225      1/2014
CN      106742004      5/2017
(Continued)

OTHER PUBLICATIONS

International Search Report and Written Opinion for International Application No. PCT/EP2018/078758 dated Nov. 23, 2018, 12 pgs.
(Continued)

*Primary Examiner* — Michael R Neff
(74) *Attorney, Agent, or Firm* — Lowenstein Sandler LLP

(57) ABSTRACT

The present invention relates to an apparatus for plant management. It is described to provide (210) a processing unit with at least one image of a field. The processing unit analyses (220) the at least one image to determine information relating to a plant that is present. The processing unit determines (230) if the plant is to be controlled or is not to be controlled by a plant control technology based on the information relating to the plant. An output unit outputs (240) information that is useable to activate at least one plant control technology if the determination is made that the plant is to be controlled by the plant control technology.

13 Claims, 8 Drawing Sheets

(51) Int. Cl.
*G06Q 50/02* (2012.01)
*G06V 20/10* (2022.01)

(58) Field of Classification Search
USPC .......................................................... 382/110
See application file for complete search history.

(56) References Cited

U.S. PATENT DOCUMENTS

| | | | |
|---|---|---|---|
| 2006/0213167 A1 | 9/2006 | Koselka et al. | |
| 2010/0316738 A1* | 12/2010 | Jimenez | A01N 27/00 |
| | | | 424/725 |
| 2014/0180549 A1* | 6/2014 | Siemens | A01G 25/09 |
| | | | 701/50 |
| 2015/0187109 A1* | 7/2015 | Mentzer | G06T 11/00 |
| | | | 345/632 |
| 2016/0050840 A1 | 2/2016 | Sauder et al. | |
| 2018/0024050 A1* | 1/2018 | Hollstein | A01M 7/0089 |
| | | | 382/103 |

FOREIGN PATENT DOCUMENTS

| | | |
|---|---|---|
| CN | 106814745 | 6/2017 |
| CN | 106956778 | 7/2017 |
| WO | WO-2014/160589 A1 | 10/2014 |
| WO | 2015/181642 | 12/2015 |

OTHER PUBLICATIONS

Christian Scholz et al, "Camera-based selective weed control application module (Precision Spraying App) for the autonomous field robot platform BoniRob", Proceedings International Conference of Agricultural Engineering, Zurich, Jul. 1, 2014, 9 pages.

Tom Simonite, "Why John Deere Just Spent $305 Million on a Lettuce-Farming Robot", Wired Business, Jun. 9, 2017, pp. 1-3, California, https://www.wired.com/story/why-john-dere-just-spent-dollar305-million-on-a-lettuce-farming-robot/, 1 page.

Da Shaikh et al: "Intelligent Autonomous Farming Robot with Plant Disease Detection using Image Processing", International Journal of Advanced Research in Computer and Communication Engineering, vol. 5, No. 4, Apr. 1, 2016, 5 pages.

John L. Capinera, "Relationships between Insect Pests and Weeds: An Evolutionary Perspective", Weed Science, vol. 53, No. 6, Nov. 1, 2005, 11 pages.

European Search Report for EP Patent Application No. 17198812.4, dated Apr. 20, 2018, 4 pages.

European Search Report for EP Patent Application No. 17198814.0, dated Jan. 26, 2018, 3 pages.

* cited by examiner

APPARATUS FOR PLANT MANAGEMENT

FIELD OF THE INVENTION

The present invention relates to an apparatus for plant management, a system for plant management, and a method for plant management, as well as to a computer program element.

BACKGROUND OF THE INVENTION

The general background of this invention is the management of plants in an agricultural field. The management of plants, in particular the actual crops, also comprises the management of weed in the agricultural field, as well as management of the insects in the agricultural field.

Integrated weed management rules ask that farmers eradicate weeds where no survivors are tolerated in order to reduce resistance build up within the weed genotype in the field. However, this is not in line with a desire to reduce the overall chemical use, or to support biodiversity, in the field.

Additionally, farmers wish to encourage beneficial insects, such as bees in a crop field, whilst at the same time controlling pest insects that are detrimental to the crop. These requirements can be contradictory when it comes to spraying the crop with an insecticide, and there is also the complicating factor that there is a desire to reduce the overall chemical use in the field.

SUMMARY OF THE INVENTION

It would be advantageous to have improved means for the management of plants in an agricultural field.

The object of the present invention is solved with the subject matter of the independent claims, wherein further embodiments are incorporated in the dependent claims. It should be noted that the following described aspects and examples of the invention apply also for the apparatus for plant management, the system for plant management, and the method for plant management, and for the computer program element and computer readable medium.

According to a first aspect, there is provided an apparatus for plant management, comprising:

an input unit;
a processing unit; and
an output unit.

The input unit is configured to provide the processing unit with at least one image of a field. The processing unit is configured to analyse the at least one image to determine information relating to a plant that is present. The processing unit is configured also to determine if the plant is to be controlled or is not to be controlled by a plant control technology based on the information relating to the plant. If the determination is made that the plant is to be controlled by the plant control technology, the output unit is configured to output information useable to activate the plant control technology.

The plant control technology, as used herein, preferably comprises chemical, mechanical and/or electric control technology. Chemical control technology preferably comprises at least one means, particularly a spray gun, for application of insecticides and/or herbicides. Mechanical control technology preferably comprises means for sucking, pulling and/or stamping plants and/or insects. Electric control technology comprises Zasso and/or radiation, particularly laser, based means for controlling plants and/or insects.

Preferably, plant control technology, as used hereinbefore and hereinafter, comprises weed control technology as well as insect control technology, wherein weed control technology includes any plant control technology configured to be used against weed and wherein insect control technology includes any plant control technology configured to be used against insects.

Preferably, plant management comprises weed management to maintain or remove weed in the agricultural field, in particular with plant control technology, and insect management, to maintain or remove insects in the agricultural field.

In other words, imagery of a field can be acquired and weeds detected. A decision can then be made to control some of the detected weeds, and not to control other detected weeds.

In this way, biodiversity can be maintained/improved and the use of chemicals reduced if used as weed control and/or a reduction in the use of other weed control techniques, such as mechanical plant removal. This leads to cost savings and efficiency improvement as the time taken to weed a field is reduced, because not all of the detected weeds are controlled.

Additionally, in this manner more of the field can be used for the crop, because the farmer does not need to add flower strips or fallow land, because weeds can be integrated into the crop itself in a controlled manner, and is also more likely to lead to acceptance of modern farming practices in society.

To put this another way, robotic plant management incorporating the ability to determine if a detected weed should be controlled (e.g. killed or destroyed) or not is used to reduce costs, and at the same time provide positive effects relating to increased biodiversity in a controlled manner. Image processing of imagery, having an appropriate spatial resolution, is used to detect weeds and determine which weeds should be destroyed (controlled) or not.

In this way, a number of naturally occurring weeds are not controlled, such that there is not a relevant yield loss, whilst increasing biodiversity, and where for example all weeds of a particular type of can be destroyed if that weed type is particularly problematic and can affect the yield negatively.

In other words, imagery of a field can be acquired and a decision can then be made to control the plant based on image analysis relating to the plant. In this way, if a plant is determined to be a plant other than a plant of the crop (i.e. weed), but that plant attracts beneficial insects, a determination can be made that the plant should not be controlled but allowed to grow in the field.

In this manner, if a plant is determined to be a plant other than a plant of the crop (i.e., a weed), but even though that plant attracts beneficial insects that weed may itself have a negative impact on the yield of the crop, then a determination can be made that the plant should be controlled by weed control technology.

This enables that if a plant is determined to be a plant other than a plant of the crop, but that plant attracts insects that are detrimental to the crop a determination can be made that the plant should be controlled by plant control technology to kill the plant and possibly with an insect control technology to kill such pest insects.

In this way, if a plant of the crop is detected, and beneficial insects are detected on the crop plant, a decision can be made not control the crop plant. In this way, if a plant of the crop is detected, and insects are detected on the crop plant, that are detrimental to the crop, a decision can be made to control the crop plant with an insect control technology.

In other words, a decision is made if a plant has to be protected against insects or not and whether particular plants that attract detrimental insects should be destroyed and insects on that plant also killed. Thus, for example aphids are killed by controlling a wheat plant by insect control technology, but a corn flower that feeds bees is spared and not controlled by weed control technology or insect control technology when bees are feeding on the nectar. However, if before flowering the corn flower has aphids or it is a time of year when aphids are prevalent but bees are not feeding on the corn flower, the corn flower can controlled by an insect control technology because beneficial insects are not expected to be destroyed. However, if a weed is present that attracts aphids but does not attract beneficial insects such as bees, then the plant can be controlled by a weed control technology to kill it if no aphids are detected in order that the plant is killed or even if no aphids are detected but it is anticipated that they will soon arrive the plant can be controlled by insect control technology. This could be in addition to or instead of controlling with a weed control technology. If aphids (or other detrimental insects) are detected on the plant, then it can be controlled by insect control technology if it is a crop plant and controlled by weed control technology and insect control technology if it is a weed that does not attract beneficial insects. Also, if a plant is detected that has detrimental and beneficial insects present, for example aphids and bees on the plant, then a decision can be made to spare the plant if the proportion of beneficial insects is high enough to mitigate the detrimental result of the aphids, and similarly if there are only a small number of bees present but lots of aphids, then the plant can be controlled to kill all the insects and possibly also to kill the plant.

In this manner, beneficial insects can be maintained and encouraged, whilst detrimental insects (pests) controlled by a reduction in the use of chemicals. This also leads to cost savings and efficiency improvement, because not all of the plants of the crop have to be controlled and not all the weeds have to be controlled by insect control technology and/or weed control technology.

Additionally, in this manner the societal appreciation of modern farming practices is enhanced because insects that are detrimental are controlled whilst at the same time beneficial insects are spared and encouraged, and this is also more likely to lead to acceptance of modern farming practices in society.

To put this another way, robotic insect management incorporating the ability to determine if a plant or indeed part of a plant should be controlled or not controlled by a plant control technology in order to manage and control insects is used to reduce costs, save time, reduce chemical usage and at the same time provide positive effects relating to increased biodiversity and enhanced pollination of the crop in a controlled manner. Image processing of imagery, having an appropriate spatial resolution, is used to detect and identify if a plant is a crop plant or a weed and to determine if that weed could be attractive to the wrong type of insects and be controlled by plant control technology in order to manage insects. Also, image processing of imagery, having an appropriate spatial resolution, is used to detect and identify insects on weeds or on crop plants in order to determine if that weed or crop plant should be controlled or not controlled by an insect control technology in order to manage insects.

Thus, image processing is used with plant control technology, particularly sprayers, that can be precision control technology, particularly sprayers, and even ultra-precision control technology, particularly sprayers, to enable certain plants, whether crop plants or weeds, to be controlled by plant control technology when necessary to manage the insects in a field, encouraging beneficial insects whilst controlling detrimental insects and doing this with a reduction in chemical use. Decisions to control or not to control can be based on how attractive the plant is to beneficial insects as a food source weighed up against how attractive the plant is to pest insects, and such decisions can also be made taking into account if insects, whether beneficial or pests, are present on the plant. Thus for example beneficial insects, such as bees that mostly feed on nectar and help pollination, and which is something the farmer wants, can be encouraged to exist in the field, whilst pests such as aphids that cause damage to the crop plants by sucking sap or eating leaves or placing eggs are controlled.

Preferably, the processing unit is configured to analyse the at least one image to determine that a weed is present, wherein the processing unit is configured to determine if the weed is to be controlled by a weed control technology or is not to be controlled by the weed control technology and wherein, if the determination is made that the weed is to be controlled by the weed control technology, the output unit is configured to output information useable to activate the weed control technology.

Preferably, the processing unit is configured to analyse the at least one image to determine information relating to a plant that is present, wherein, the processing unit is configured to determine if the plant is to be sprayed with an insecticide and/or herbicide or is not to be sprayed with the insecticide and/or herbicide based on the information relating to the plant, and wherein, if the determination is made that the plant is to be sprayed with the insecticide and/or herbicide, the output unit is configured to output information useable to activate at least one spray gun.

In an example, the determination if the plant is to be controlled by the plant control technology comprises application of at least one biodiversity setting and/or at least one agronomic rule. In other words, the at least one biodiversity setting and/or at least one agronomic rule can be used to decide the weeds that are permitted to survive and which weeds need to be controlled. Additionally, the at least one biodiversity setting and/or at least one agronomic rule can be used to decide the insects that are permitted to survive and which insects need to be controlled.

The biodiversity setting includes insects and weed that is beneficial for the field ground and results in reduction of erosion through water and wind. The thresholds for determining, whether a control technology should be applied include determination of the size and the growth stage of plants. The processing unit is configured to determine the size and the growth stage of the plants in the image, when analyzing the image. Preferably, the processing unit is configured to apply growth stage models to determine, in which size the plant has or in which growth stage the plant is.

Therefore, the processing unit analyzes the image in view of at least one of the factors, weed type of weed, number of weed, environment of crop with respect to weed in the field, insect, insect type, number of insects and environment of crop with respect to insects in the field.

In order to determine if the plant is to be controlled or not, the processing unit preferably weighs the various determined factors in view of the biodiversity setting to provide optimal biodiversity in the field combined with maximum yield.

In an example, the processing unit is configured to analyse the at least one image to identify the plant. The information relating to the plant can then comprise the identity of the plant.

In an example, the processing unit is configured to analyse the at least one image to determine if the plant is a specimen of a crop grown in the field or if the plant is a weed. The information relating to the plant can then comprise the determination of the plant belonging to the crop or the determination that the plant is a weed.

In an example, if the determination is made that the plant is a weed, the processing unit is configured to analyse the at least one image to determine a type of weed for the plant. The information relating to the plant can then comprise the determined type of weed.

In other words, it can be determined if the plant is a crop plant or is a weed, and this information used to determine if the plant should be controlled. Furthermore, if the plant is identified as a weed the processing unit can have a list of weeds and their associated attractiveness to different insects and at different times of years. Thus, this information can be used to determine if a weed should be controlled by insect control technology if it is attractive to detrimental insects. Also, if the weed is disruptive to the yield of the crop and but is attractive to beneficial insects then a decision can be made to control the weed by weed control technology to kill the weed but not kill the insects, which will then move to a different plant. However, a disruptive weed that is also attractive to detrimental insects can be controlled by insect control technology and also controlled by weed control technology.

In an example, the processing unit is configured to analyse the at least one image to determine a number of weeds, in particular of that type, in an area of the field. The information relating to the plant can then comprise a determination if the number of weeds of that type divided by the area exceeds a threshold number of weeds of that type per unit area.

In an exemplary embodiment, the at least one biodiversity setting and/or at least one agronomic rule comprises the threshold number of weeds per unit area.

In other words, a density of weeds per unit area is permitted, in order to support biodiversity in the field, such as continuous root growth for the soil edaphone, flowering in the field during longer periods than that from the crop itself to feed beneficial insects for example.

In other words, a density of particular types of weeds per unit area is permitted, enabling specific weed types that are beneficial to insects, when below a threshold, to be permitted, providing benefits of flowering in the field during longer periods than that from the crop itself to feed beneficial insects for example. Thus, even if the beneficial insects are not pollinating the crop plants now, the population of the beneficial insects can be encouraged and supported in order that later in the season, or even in the following year when that crop or a different crop requires pollination, there will be a managed population of beneficial insects in and around the field.

In other words, even those weeds that are beneficial to be in a field, can be controlled when their number density is too high, in order to ensure the positive effects of biodiversity. In this manner, weeds that are disruptive to the crop through for example contamination of the harvest if in too high a quantity may also be beneficial to insects such as bees, and therefore can be permitted in low enough number densities but certain individuals of that plant can be controlled by weed control technology when their number density is above a permitted threshold number density.

In an example, the at least one biodiversity setting and/or at least one argonomic rule comprises a list of at least one weed that is to be controlled and/or a list of at least one weed that is not to be controlled. When the type of weed is on the list of weeds that are not to be controlled, the type of weed is controlled when a number of weeds of that type divided by the area exceeds the threshold number of weeds of that type per unit area.

Thus, the processing unit has a list of weeds that should be controlled, which could be particularly virulent or toxic weeds for example or weeds that are particularly disruptive to the crop being grown in the field. If a weed is detected that is one of those on the list, then it can be controlled (killed or destroyed or otherwise have means applied to it to disable or kill it).

In this manner, the processing unit has a list of weeds that are permitted in the crop, and if detected such weeds can be allowed to exist in the field.

In an example, the processing unit is configured to analyse the at least one image to detect at least one insect on the plant. The information relating to the plant can then comprise the detection of the at least one insect.

In this way a decision can be made to control crop plants or weeds in the field on the basis of whether there are insects present. For example, it could be at a time of year when plants are not flowering and therefore beneficial pollinating plants such as bees are unlikely to be present, but sap sucking insects could be present. Therefore, when insects are detected on a crop plant or weed, a decision can be made to control the plant by an insect control technology and if necessary also with a herbicide without having to identify the specific type or types of insect. Thus, there is no requirement to identify the insect, but other information such as the time of year, the location, the stage of growth of the crop, and indeed the identity of the plant the insects are on etc can be used to predict what the detected insects are likely to be and a decision whether to control or not can be made, depending upon whether they are predicted to be pests or beneficial insects or a predicted high enough percentage of beneficial insects in comparison to pests that it would be best not to control by insect control technology. Thus, insects could be predicted to be pests and the plant controlled by an insect control technology, and if the plant was determined to be a detrimental weed the plant could also be controlled by a weed control technology. Also, if insects are predicted to be a mixture of pests and beneficial insects with a low enough percentage of beneficial insects the plant could be again controlled by an insect control technology, and if on a detrimental weed also controlled by a weed control technology.

In an example, the processing unit is configured to analyse the at least one image to determine a type of insect for an insect of the at least one insect detected. The information relating to the plant can then comprise the type of insect. The processing unit is configured to analyse the at least one image to determine a number of insects of that type on the plant. The information relating to the plant can then comprise the determined number of insects of that type on the plant exceeding a threshold number. The processing unit is configured to analyse the at least one image to determine a number of plants in an area of the field that have that type of insect. The information relating to the plant can then comprise a determination if the number of plants having that type of insect in that area divided by the area exceeds a threshold number.

In other words, in addition to controlling weeds in the field on the basis of how attractive they are to different insects, ranging from being attractive to beneficial insects and so not controlled to being attractive to beneficial and detrimental insects to being attractive to detrimental insects, the decision to control or not can take account of whether there are indeed any insects present and indeed take into account the different species of insects present. Thus, a crop plant can have a number of detrimental insects on it and be controlled by an insect control technology or have a number of beneficial insects on it and not be controlled. Thus, a weed that is considered to be attractive to beneficial insects, and not attractive to detrimental insects, could actually be full of detrimental insects and be controlled. Also, a weed that is considered to be attractive to detrimental insects, and not attractive to beneficial insects, could actually be full of beneficial insects and not be controlled. Also, general weeds that are neither particularly attractive nor particularly unattractive to insects and indeed specific types of insects, can be controlled or not depending upon the specific types of insects on or around the weed.

In this way, if a large number of beneficial insects are found on a plant, then a decision can be made not to control the plant by insect control technology even if detrimental insects are also present. Also, if only a few detrimental insects are found on a plant, a decision can be made not to control the plant by insect control technology in order to reduce the amount of insecticide used.

Thus, a weed can have a potentially negative impact to the crop yield, through for example contamination, but attract beneficial insects. Then, if a large number of plants of that type are to found with the beneficial insects then a decision can be made to control a number of those plants by weed control technology, thus maintaining the beneficial insects but mitigating the effect of the weed. Also, if a number of plants in an area of a field have a large number of detrimental insects then a determination can be made to control all the plants in an around that area by insect control technology to control the insect infestation.

Preferably, the processing unit is configured to analyse the at least one image to determine a location of the plant, in particular the weed, in the at least one image.

In this way, an image can have an areal footprint on the ground and/or a horizontal spatial extent. By locating the plant in the image, the actual position of the plant can be determined to an accuracy better than the overall footprint of the image. Thus a plant control technology, for example a chemical spray or mechanical manipulator carried by the vehicle that acquired and processed the image can be accurately used to control the plant. Also, by knowing the position of the plant accurately, a different vehicle to that that acquired and processed the image can go though the field and control the plants at their locations using its plant control technology.

In an example, the at least one image was acquired by at least one camera, and the input unit can be configured to provide the processing unit with at least one geographical location associated with the at least one camera when the at least one image was acquired.

In an example, location determining means is configured to provide the processing unit with at least one location associated with the camera when the at least one image relating to the crop was acquired.

The location can be a geographical location, with respect to a precise location on the ground, or can be a location on the ground that is referenced to another position or positions on the ground, such as a boundary of a field or the location of a drone docking station or charging station. In other words, an absolute geographical location can be utilized or a location on the ground that need not be known in absolute terms, but that is referenced to a known location can be used.

In an example, the location is an absolute geographical location.

In an example, the location is a location that is determined with reference to a known location or locations.

In other words, an image can be determined to be associated with a specific location on the ground, without knowing its precise geographical position, but by knowing the location where an image was acquired with respect to known position(s) on the ground the location where imagery was acquired can be logged. In other words, absolute GPS derived locations of where the vehicle (e.g. UAV or robotic land vehicle) has acquired imagery could be provided, and/or the locations of where imagery was acquired relative to a known position such as a field boundary or position of a charging station for the UAV could be provided, which again enables the exact positions where imagery was acquired to be determined because the absolute position of the field boundary or charging station is known.

In an example, a GPS unit is used to determine, and/or is used in determining, the location, such as the location of the camera when specific images were acquired.

In an example, an inertial navigation unit is used alone, or in combination with a GPS unit, to determine the location, such as the location of the camera when specific images were acquired. Thus for example, the inertial navigation unit, comprising for example one or more laser gyroscopes, is calibrated or zeroed at a known location (such as a docking or charging station) and as it moves with the at least one camera the movement away from that known location in x, y, and z coordinates can be determined, from which the location of the at least one camera when images were acquired can be determined.

Thus, imagery can be acquired by one platform, that could analyse it to detect weeds and determine which weeds are to be controlled, and the locations of the weeds to be controlled determined. For example a UAV can fly around a field (or a robotic land vehicle moves around the field) and acquires and analyses the imagery. Then the information of the locations of the weeds can be used by a second platform, for example a robotic land vehicle that goes to the locations of the weeds and controls them, for example by applying a chemical spray at that location or mechanically extracting the weed—for example.

Thus, by correlating an image with the geographical location where it was acquired, the weed control technology can be accurately applied to that location.

Thus, imagery can be acquired by one platform, that could analyse it to determine plants that are to be controlled, and the locations of those plants can be determined. For example a UAV can fly around a field and acquires and analyses the imagery. Then the information of the locations of the plants to be controlled can be used by a second platform, for example a robotic land vehicle that goes to the locations of the weeds and controls them.

Thus, by correlating an image with the geographical location where it was acquired, the plant control technology can be accurately activated at that location.

In an example, analysis of the at least one image comprises utilisation of a machine learning algorithm.

Preferably, the apparatus in configured to measure the biodiversity of the field, by generating a biodiversity index for the field. In a preferred embodiment, the processing unit is configured to determine to generate parameters for the biodiversity from the image, when analyzing the image.

According to a second aspect, there is provided system for plant management, comprising:

at least one camera;
an apparatus for plant management according to the first aspect and any associated example; and
at least one plant control technology.

The at least one camera is configured to acquire the at least one image of the field. The at least one plant control technology, particularly a spray gun, is mounted on a vehicle. The apparatus is configured to activate the at least one plant control technology at a location of the plant if the determination is made that the plant is to be controlled by the plant control technology.

In this way, a vehicle can move around and manage plants as required. In this way, imagery can be acquired by one platform, for example one or more drones that fly over a field. That information is sent to an apparatus that could be in an office. The apparatus determines what plants should be controlled and where they are within the field. This information, can be provided in a plant map, in particular a spray map or a weed map, that is provided to a vehicle that moves around that environment, and at specific parts of the field activates its plant control technology.

In an example, the apparatus is mounted on the vehicle. In an example, the at least one camera is mounted on the vehicle.

In this manner, the system can operate in real time or quasi real time, where a vehicle acquires imagery, analyses it to determine which plants are to be controlled and which are not to be controlled, and then the vehicle itself can activate its plant control technology to control plants that need to be controlled. This can be done immediately According to a third aspect, there is provided a method for plant management, comprising:

a) providing a processing unit with at least one image of a field;
c) analysing by the processing unit the at least one image to determine information relating to a plant that is present;
d) determining by the processing unit if the plant is to be controlled or is not to be controlled by a plant control technology based on the information relating to the plant; and
e) outputting information by an output unit that is useable to activate at least one plant control technology if the determination is made that the plant is to be controlled.

According to another aspect, there is provided a computer program element for controlling the apparatus of the first aspect, and/or the system according to the second aspect, which when executed by a processor is configured to carry out the method of the third aspect.

According to another aspect, there is provided a computer readable medium having stored the computer program element.

Advantageously, the benefits provided by any of the above aspects equally apply to all of the other aspects and vice versa. The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
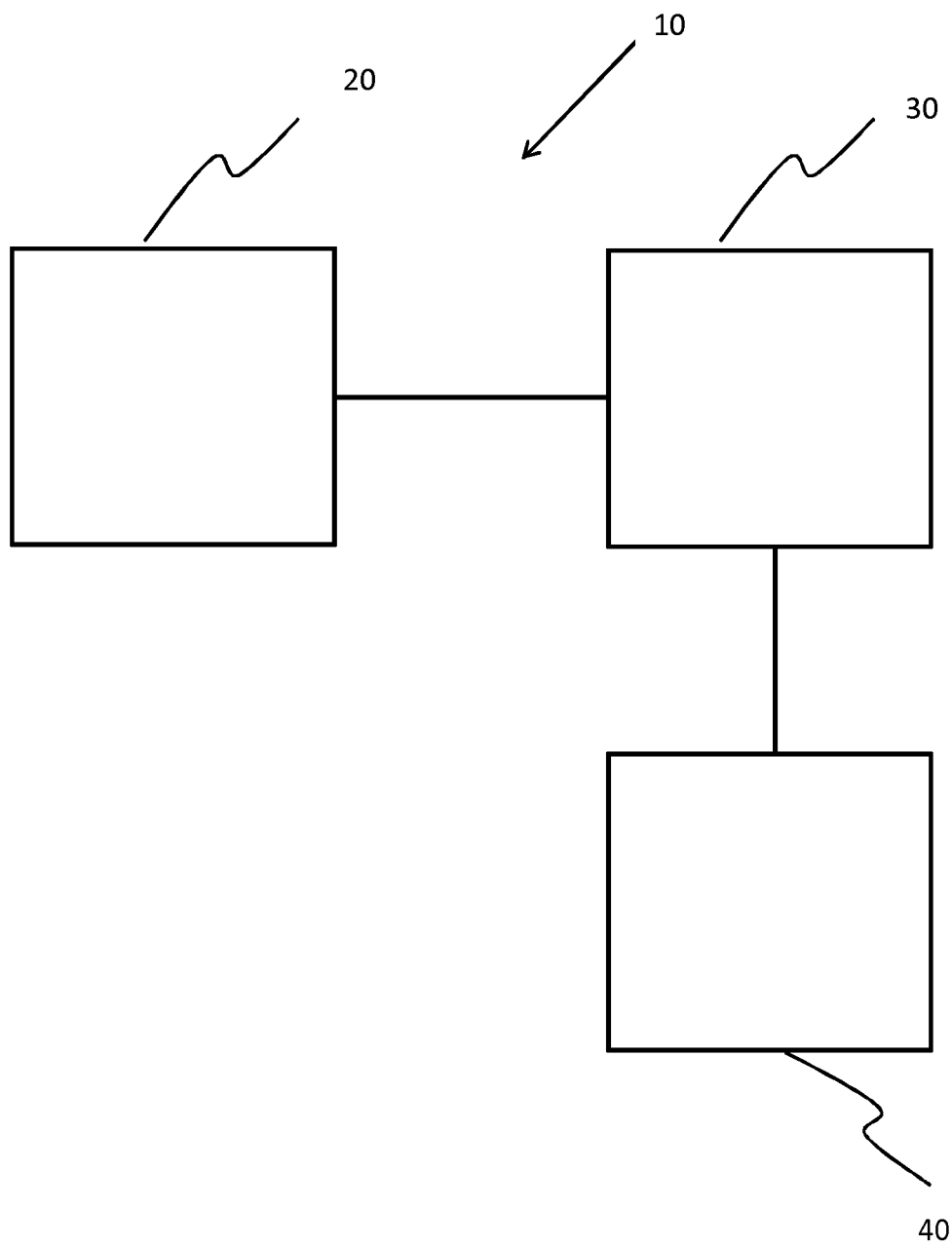
FIG. 1 shows a schematic set up of an example of an apparatus for plant management.

FIG. 1 shows an example of an apparatus 10 for plant management, particularly insect management. The apparatus 10 comprises an input unit 20, a processing unit 30, and an output unit 40. The input unit 20 is configured to provide the processing unit 30 with at least one image of a field.

In this embodiment, the insect control technology is an insecticide and the weed control technology is a herbicide. Also, the plant control technology is configured as a spray.

The processing unit 30 is configured to analyse the at least one image to determine information relating to a plant that is present. The processing unit 30 is configured also to determine if the plant is to be sprayed with an insecticide and/or herbicide or is not to be sprayed with the insecticide and/or herbicide based on the information relating to the plant. If the determination is made that the plant is to be sprayed with the insecticide and/or herbicide, the output unit is configured to output information useable to activate at least one spray gun.

In an example, the apparatus is operating in real-time, where images are acquired and immediately processed and a decision is immediately made to spray a plant or not to spray the plant, and if the plant is to be sprayed the spray gun is immediately used to spray the plant, and if the plant is not to be sprayed the spray gun is not activated. Thus, for example a vehicle can acquire imagery of its environment and process that imagery to determine if a plant is to be sprayed or not. Thus, for example a UAV can fly around a field and acquire imagery and determine if plants should be sprayed or not, via a spray gun located on the UAV. Thus, for example a robotic land vehicle can move around a field and acquire imagery and determine if plants should be sprayed or not, via a spray gun located on the robotic land vehicle.

In an example, the apparatus is operating in quasi real time, where images are acquired of a field and immediately processed to determine if plants should be sprayed or not. That information can later be used by an appropriate system (or systems) that travel(s) within the field and uses its spray gun to spray some of the plants and leave others of the plants alone. Thus, for example, a first vehicle, such as an unmanned aerial vehicle (UAV) or drone equipped with one or more cameras can travel within a field and acquire imagery. This imagery can be immediately processed to determine which plants whether crop plants or weeds should be sprayed, with the other crop plants and weeds being left alone. Thus, in effect a "spray map" is generated detailing the location of crop plants and weeds that need to be sprayed with an insecticide and/or herbicide. Later, a vehicle equipped with a spray gun or several spray guns that can spray insecticide and/or herbicide can travel within the field and spray the crop plants and weeds that were previously determined to need to be sprayed. Thus, for example, a UAV with a chemical spray gun then flies to the location of the weeds that need to be controlled and sprays the weeds, or a robotic land vehicle travels within the field and uses its chemical spray gun and applies the herbicide and/or insecticide to the plants that have been determined to require to be sprayed.

In an example, the apparatus is operating in an offline mode. Thus, imagery that has previously been acquired is provided later to the apparatus. The apparatus then image processes the imagery and determines which plants in the field whether crop plants or weeds should be sprayed with an insecticide and/or herbicide, to in effect generate a spray map of specific plants and their locations that need to be sprayed. The spray map is then used later by one or more vehicles that then travel within the field and activate their spray guns at the locations of the plants that need to be sprayed, using the spray map, to manage insects in the field.

In an example, the output unit outputs a signal that is directly useable to activate one or more spray guns.

According to an example, the processing unit is configured to analyse the at least one image to identify the plant. The information relating to the plant can then comprise the identity of the plant.

According to an example, the processing unit is configured to analyse the at least one image to determine if the plant is a specimen of a crop grown in the field or if the plant is a weed. The information relating to the plant can then comprise the determination of the plant belonging to the crop or the determination that the plant is a weed.

According to an example, if the determination is made that the plant is a weed, the processing unit is configured to analyse the at least one image to determine a type of weed for the plant.

The information relating to the plant can then comprise the determined type of weed.

According to an example, the processing unit is configured to analyse the at least one image to determine a number of weeds of that type in an area of the field. The information relating to the plant can then comprise a determination if the number of weeds of that type divided by the area exceeds a threshold number of weeds of that type per unit area.

In an example, the processing unit is configured to analyse the at least one image to determine a location of the plant in the at least one image. In other words, an image will have an areal footprint on the ground, and by locating the crop plant or weed in the image, the actual position of the crop plant or weed on the ground can be determined to an accuracy better than the overall footprint of the image. Thus a chemical spray gun carried by the vehicle that acquired and processed the image can be accurately used to spray the crop plant or weed in order to manage the insects in the field more effectively and efficiently. Also, by knowing the position of the crop plant or weed accurately, a different vehicle to that that acquired and processed the image can go though the field and spray the required crop plants and weeds at their locations using its spray gun(s).

According to an example, the processing unit is configured to analyse the at least one image to detect at least one insect on the plant. The information relating to the plant can then comprise the detection of the at least one insect.

According to an example, the processing unit is configured to analyse the at least one image to determine a type of insect for an insect of the at least one insect detected. The information relating to the plant can then comprise the type of insect.

According to an example, the processing unit is configured to analyse the at least one image to determine a number of insects of that type on the plant. The information relating to the plant can then comprise the determined number of insects of that type on the plant exceeding a threshold number.

According to an example, the processing unit is configured to analyse the at least one image to determine a number of plants in an area of the field that have that type of insect. The information relating to the plant can then comprise a determination if the number of plants having that type of insect in that area divided by the area exceeds a threshold number.

In an example, the processing unit is configured to analyse the at least one image to determine a location or a plurality of locations of the at least one insect in the at least one image.

In this way, not all of the plant or area around a plant need be sprayed, but just at the location of an insect or insects, using for example a high precision, or ultra high precision, chemical sprayer.

According to an example, the at least one image was acquired by at least one camera. The input unit can then be configured to provide the processing unit with at least one geographical location associated with the at least one camera when the at least one image was acquired.

In an example, a GPS unit is used to determine the location of the at least one camera when specific images were acquired.

In an example, an inertial navigation unit is used alone, or in combination with a GPS unit, to determine the location of the at least one camera when specific images were acquired. Thus, for example, the inertial navigation unit, comprising for example one or more laser gyroscopes, is calibrated or zeroed at a known location (such as a docking or charging station) and as it moves with the at least one camera the movement away from that known location in x, y, and z coordinates can be determined, from which the location of the at least one camera when images were acquired can be determined.

In an example, image processing of acquired imagery is used alone, or in combination with a GPS unit, or in combination with a GPS unit and inertial navigation unit, to determine the location of the at least one camera when specific images were acquired. Thus visual markers can be used alone, or in combination with a GPS unit and/or an inertial navigation unit to determine the location of the at least one camera when specific images were acquired.

According to an example, analysis of the at least one image comprises utilisation of a machine learning algorithm.

In an example, the machine learning algorithm comprises a decision tree algorithm.

The decision tree algorithm takes into account at least one of the factors, biodiversity of insects on the ground, insects on the plants, weeds, the vulnerable potential of weeds depending on number of seeds, competitive situation in the field with respect to the crop plant, which defines if the crop plant is already larger than the weed and will overturn the weed anyway, and green bridge in the sense of a host plant for pests such as diseases relevant to the culture or insect pests.

In an example, the machine learning algorithm comprises an artificial neural network.

In an example, the machine learning algorithm has been taught on the basis of a plurality of images. In an example, the machine learning algorithm has been taught on the basis of a plurality of images containing imagery of at least one type of weed. In an example, the machine learning algorithm has been taught on the basis of a plurality of images containing imagery of a plurality of weeds. In an example, the machine learning algorithm has been taught on the basis of a plurality of images containing imagery of at least one type of crop plant. In an example, the machine learning algorithm has been taught on the basis of a plurality of images containing imagery of a plurality of crop plants. In an example, the machine learning algorithm has been taught on the basis of a plurality of images containing imagery of at least one type of insect. In an example, the machine learning algorithm has been taught on the basis of a plurality of images containing imagery of a plurality of insects.

The imagery acquired by a camera is at a resolution that enables one type of weed to be differentiated from another type of weed, and at a resolution that enables one type of crop plant to be differentiated from another type of crop plant, and at a resolution that enables not only insects to be detected but enables one type of insect to be differentiated from another type of insect. Thus a vehicle, such as a UAV, with a camera can fly around a field and acquire imagery. The UAV (drone) can have a Global Positioning System (GPS) and this enables the location of acquired imagery to be determined. The drone can also have inertial navigation systems, based for example on laser gyroscopes. The inertial navigation systems can function alone without a GPS to determine the position of the drone where imagery was acquired, by determining movement away from a known or a number of known locations, such as a charging station. The camera passes the acquired imagery to the processing unit.

Image analysis software operates on the processing unit. The image analysis software can use feature extraction, such as edge detection, and object detection analysis that for example can identify structures such in and around the field such as buildings, roads, fences, hedges, etc. Thus, on the basis of known locations of such objects, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. In other words, an image based location system can be used to locate the drone. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image.

The processing unit therefore runs image processing software that comprises a machine learning analyser. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyser, which can be based on an artificial neural network or a decision tree analyser, is then trained on this ground truth acquired imagery. In this way, when a new image of vegetation is presented to the analyser, where such an image can have an associated time stamp such as time of year and a geographical location such as Germany or South Africa tagged to it, the analyser determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined. The machine learning algorithm, or another machine learning algorithm that runs on the processing unit is similarly trained to identify crop plants and detect insects and identify insect types on the basis of ground truth imagery as described above with respect to weeds.

Thus, the UAV can fly around a field and acquire imagery from which a decision can be made to spray a plant or not. This information is then later used by another vehicle that has a one or more spray guns, to enter the field and spray the plants that have been determined to need to be sprayed, whilst leaving other plants alone. Similarly, the image acquisition, processing and spraying can be done by the same platform, for example a UAV with a camera, processing unit and spray guns or a land robot with a camera, processing unit and spray guns.

In this way, a vehicle can operate in real time acquiring imagery and spray some plants whilst permitting other plants (probably the majority) not to be sprayed as the vehicle interrogates a field.

The processing unit has access to a database containing different weed types, different types of crop plants, and different types of insects. This database has been compiled from experimentally determined data.

Figure 2:
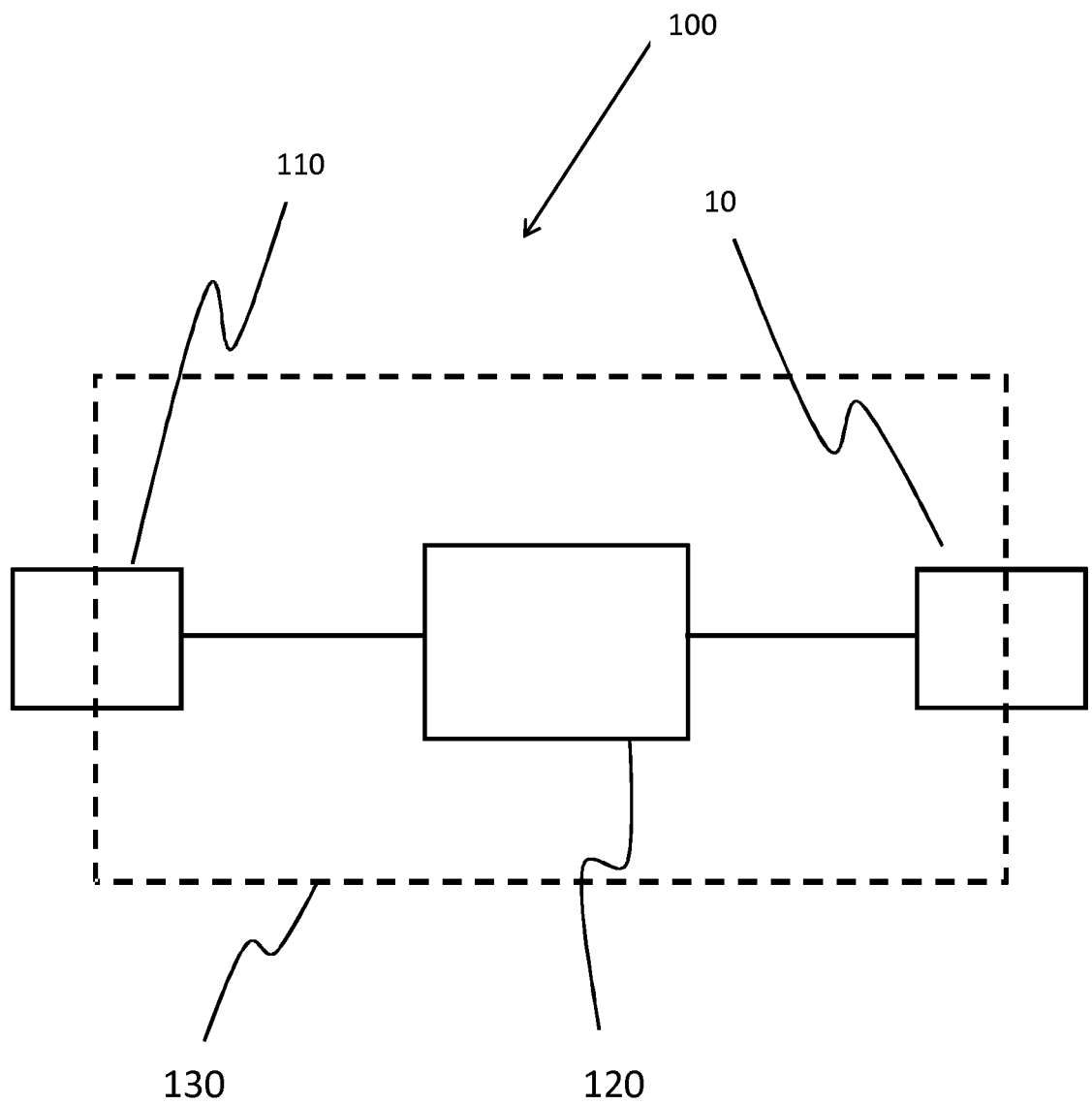
FIG. 2 shows a schematic set up of an example of a system for plant management.

The vehicle could be a robotic land vehicle, FIG. 2 shows an example of a system 100 for insect management. The system 100 comprises at least one camera 110, and an apparatus 10 for insect management as described with respect to FIG. 1 in relation to any one or more of the examples. The system 100 also comprises at least one spray gun 120. The at least one camera 110 is configured to acquire the at least one image of the field. The at least one spray gun 120 is mounted on a vehicle 130. The at least one spray gun 120 is configured to spray the insecticide and/or the herbicide. The apparatus 10 is configured to activate the at least one spray gun at a location of the plant if the determination is made that the plant is to be sprayed with the insecticide and/or herbicide.

According to an example, the apparatus is mounted on the vehicle and the at least one camera is mounted on the vehicle.

In an example, the vehicle is a robotic land vehicle. In an example, vehicle is a UAV.

Thus, the system can be used to identify a weed, such as a corn flower and in general not spray it because it is known that it will attract many bees (as it has nectar). However, if it was at a stage of growth before it flowered but aphids were anticipated to be in the field, or indeed had been detected on the plant, then the plant could be sprayed with an insecticide to kill the aphids if it was known that the efficacy of the insecticide would have reduced to an extent that when the corn flower was in flower and attracting bees, these bees would not be killed. Also, account can be taken of a weed having gone beyond flowering, and so not be attracting pollinators, and which can then be sprayed with an insecticide including a systemic insecticide. It is to be noted that spraying can be carried out at night, when pollinators are not around, however the system enables spraying during the day because a determination can be made of the identity of the insects present. In some cases, the biodiversity agronomic settings can be such that insecticide are only applied to sentinel/sacrificial plants.

Thus, insects can be managed in a field using in effect biodiversity and/or agronomic setting to encouraging beneficial insects such as bees, ladybirds whilst controlling pests such as aphids and corn borers and at the same time encouraging beneficial plants that: provide feed value for beneficial insects—also ensuring a food supply for beneficial insects after or before flowering of the main crop; provide continuous root growth with respect to certain plants/weeds—feeding the edaphone (soil life) the entire year; provide deep root growth with respect to certain plants/weeds—soil loosening and draining excess water into subsoil later in the season; attract nematode activity, in order for example that they get out of their eggs—but not feeding them then, helping to lower nematode pressure next season; providing ground cover later in the season—this can lead to a reduction in weeds and a reduction in wind and water erosion, and can help the soil to heat up, but in a way that does not compete with crops (natural underseeds); encourage wind obstacles—reducing wind erosion of the leafs of young sugar beets for example, which may be especially applicable in Strip till.

The at least one biodiversity setting and/or at least one agronomic rule can include one or more of the following in addition to what is described elsewhere within this document:

feed value for beneficial insects—also ensuring a food supply for beneficial insects after or before flowering of the main crop;

continuous root growth with respect to certain plants/weeds—feeding the edaphone (soil life) the entire year;

deep root growth with respect to certain plants/weeds—soil loosening and draining excess water into subsoil later in the season.

attracting nematode activity, in order for example that they get out of their eggs—but not feeding them then. This can help to lower nematode pressure next season;

ground cover later in season—this can lead to a reduction in weeds and a reduction in wind and water erosion, and can help the soil to heat up, but in a way that does not compete with crops (natural underseeds);

encourage wind obstacles—reducing wind erosion of the leafs of young sugar beets for example, which may be especially applicable in Strip till.

Figure 3:
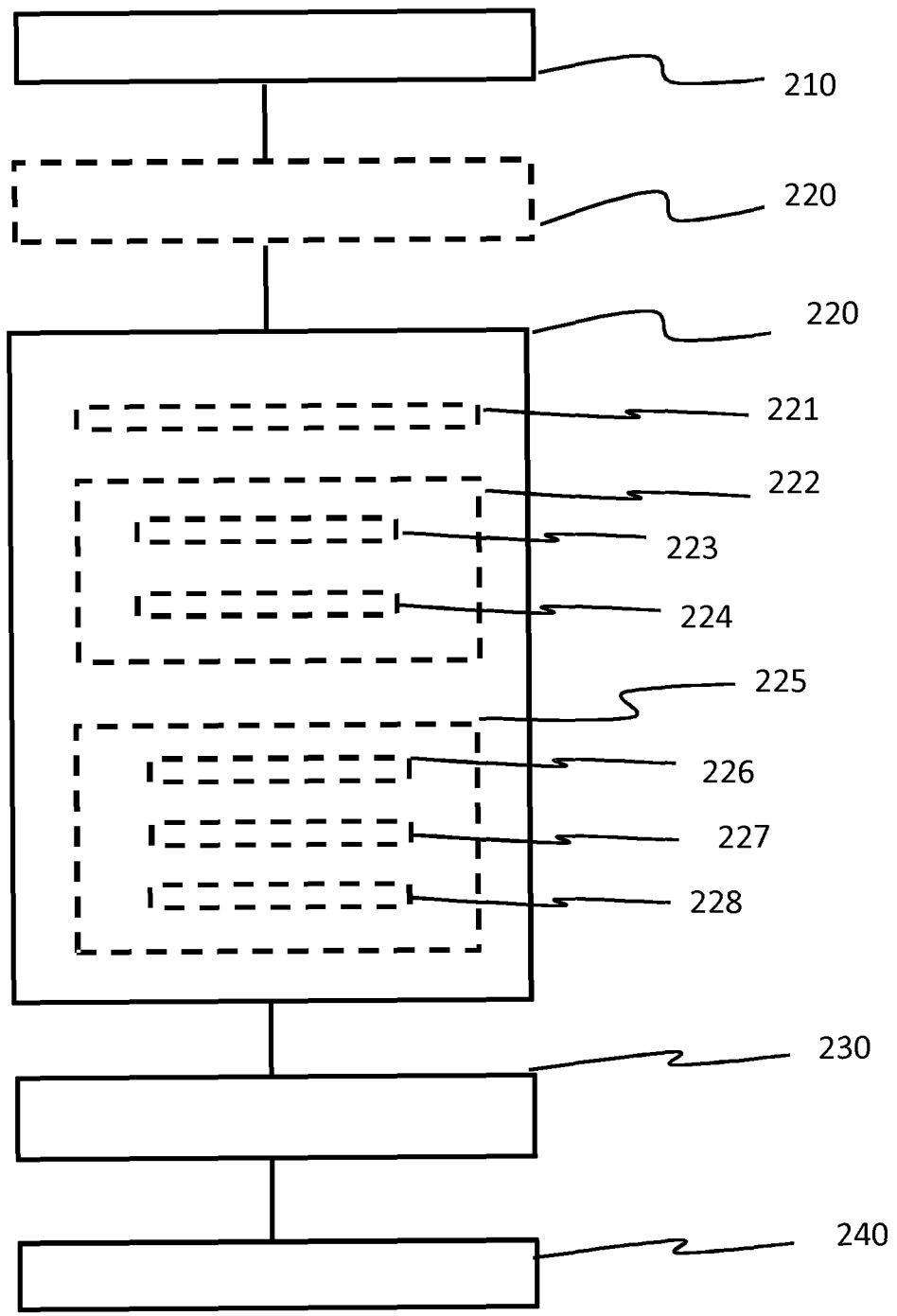
FIG. 3 shows a method for plant management.

FIG. 3 shows a method 200 for plant management, particularly insect management, in its basic steps, where dashed boxes represent optional steps. The method 200 comprise:

in a providing step 210, also referred to as step a), providing a processing unit with at least one image of a field;

in an analyzing step 220, also referred to as step c), analysing by the processing unit the at least one image to determine information relating to a plant that is present;

in a determining step 230, also referred to as step d), determining by the processing unit if the plant is to be sprayed with an insecticide and/or herbicide or is not to be sprayed with the insecticide and/or herbicide based on the information relating to the plant; and in an outputting step 240, also referred to as step e), outputting information by an output unit that is useable to activate at least one spray gun if the determination is made that the plant is to be sprayed with the insecticide and/or herbicide.

In an example, step c) comprises step c1) analysing 221 the at least one image to identify the plant, and wherein in step d) the information relating to the plant comprises the identity of the plant.

In an example, step c) comprises step c2) analysing 222 the at least one image to determine if the plant is a specimen of a crop grown in the field or if the plant is a weed, and wherein in step d) the information relating to the plant comprises the determination of the plant belonging to the crop or the determination that the plant is a weed.

In an example, in step c2) if the determination is made that the plant is a weed, step c2) comprises step c2a) analysing 223 the at least one image to determine a type of weed for the plant, and wherein in step d) the information relating to the plant comprises the determined type of weed.

In an example, following step c2a) the method comprises step c3) analyzing 224 the at least one image to determine a number of weeds of that type in an area of the field, and wherein in step d) the information relating to the plant comprises a determination if the number of weeds of that type divided by the area exceeds a threshold number of weeds of that type per unit area.

In an example, step c) comprises step c4) analysing 225 the at least one image to detect at least one insect on the plant, and wherein in step d) the information relating to the plant comprises the detection of the at least one insect.

In an example, step c4) comprises step c4a) analysing 226 the at least one image to determine a type of insect for an insect of the at least one insect detected, and wherein in step d) the information relating to the plant comprises the type of insect.

In an example, following step c4a) the method comprises step c5) analysing 227 the at least one image to determine a number of insects of that type on the plant, and wherein in step d) the information relating to the plant comprises the determined number of insects of that type on the plant exceeding a threshold number.

In an example, following step c4a) and/or step c5) the method comprises step c6) analysing 228 the at least one image to determine a number of plants in an area of the field that have that type of insect, and wherein in step d) the information relating to the plant comprises a determination if the number of plants having that type of insect in that area divided by the area exceeds a threshold number.

In an example, the at least one image was acquired by at least one camera, and wherein the method comprises step b) providing 250 at least one geographical location associated with the at least one camera when the at least one image was acquired, and wherein in step d) the information relating to the plant comprises the at least one geographical location.

In an example of the method, analysis of the at least one image comprises utilisation of a machine learning algorithm.

Figure 4:
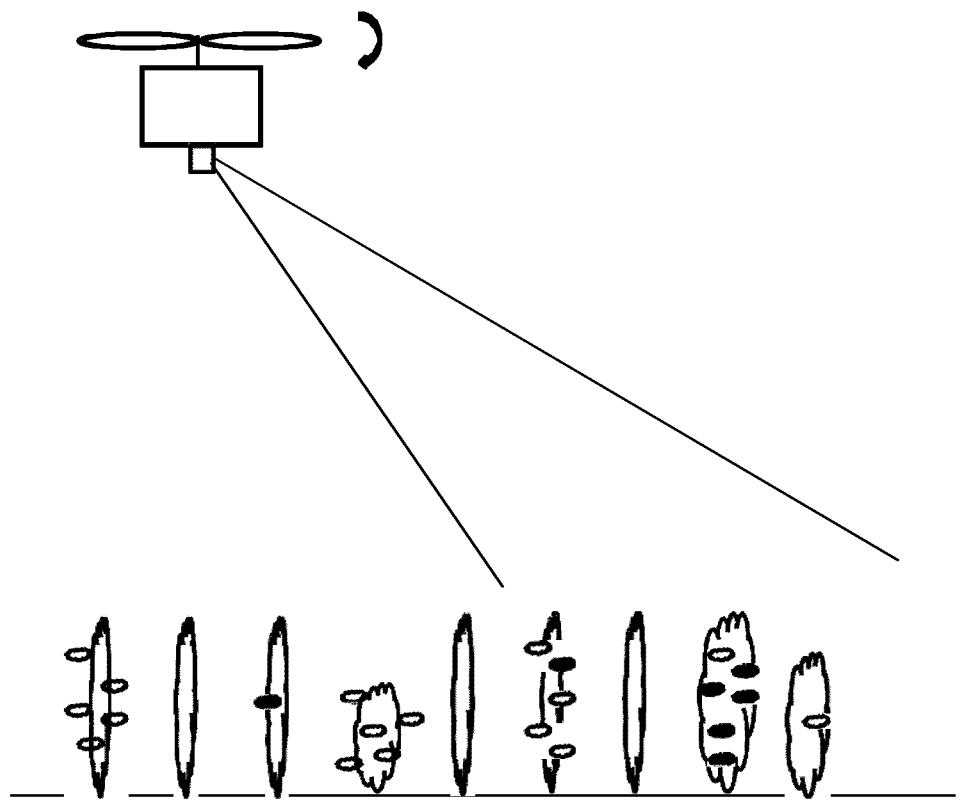
FIG. 4 shows a schematic representation of a robotic vehicle acquiring imagery of a field.
Figure 5:
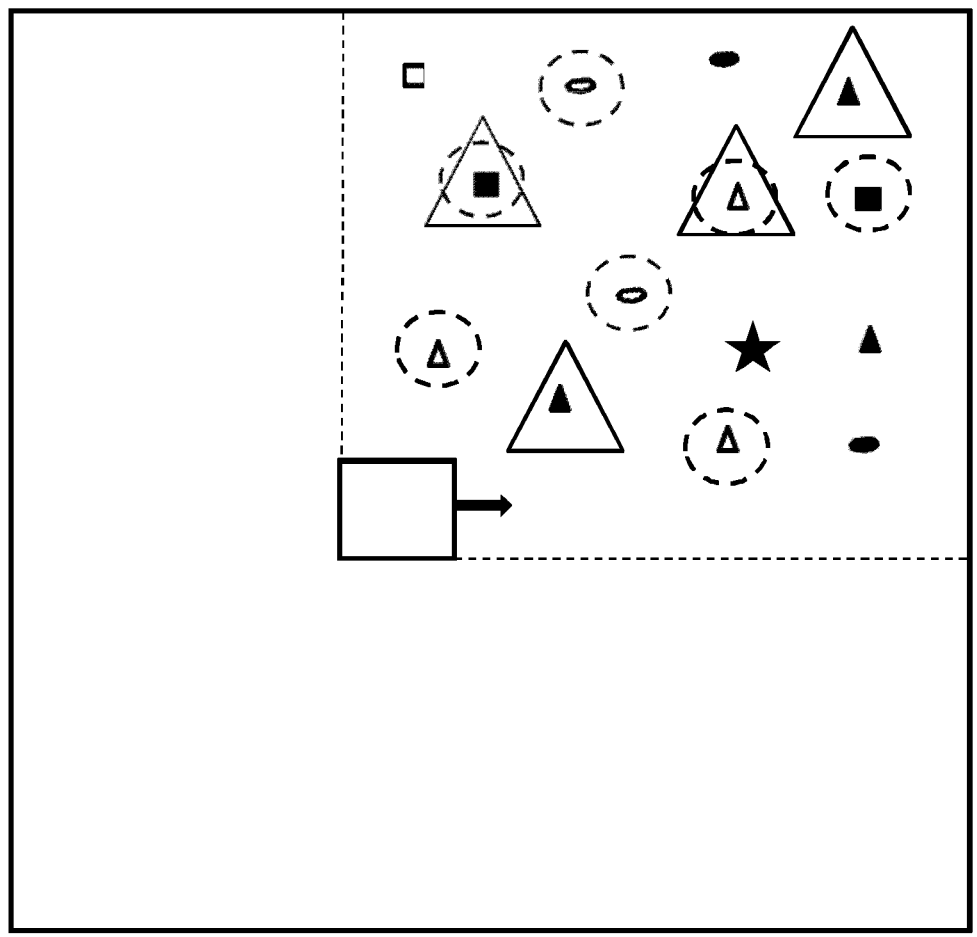
FIG. 5 shows a schematic representation of a field with crop plants and weeds, where a portion of the field has not yet had plant managed performed by a robotic vehicle.

The apparatus, system and method for insect management are now described in more detail with respect to FIGS. 4 and 5.

FIG. 4 shows an unmanned aerial vehicle (UAV) flying over a field containing a crop. In the crop there are also a number of weeds, with three particular and different weed types shown in FIG. 4. One weed type, the shorter weed shown in FIG. 4 is particularly virulent, produces numerous seeds and can significantly affect the crop yield and also attracts aphids. This weed should not be tolerated in the field containing this crop. This weed has a number of aphids on it, represented as open ellipses. Aphids should be controlled as they can be detrimental to the crop, whilst bees should be encouraged in the field. Indeed, there is also a second type of weed shown in FIG. 4 as the taller weed, which can be beneficial to the overall biodiversity for the crop in the field and which attracts bees, shown as the solid ellipses, with a smaller number of aphids on it. This weed is beneficial with the proviso that the number density of this weed per unit area is below a threshold value. A third type of weed, which is of an intermediate height attracts ladybirds later in the growing season, which predate on aphids and there is a small number of aphids on this plant at this time but no ladybirds. There is also shown plants of the crop as the tall thin plants, with one plant covered in aphids, one with a bee on it and one with a bee on it and also a larger number of aphids on it. Bees are beneficial because they can pollinate crop plants at this time and at later times in the season for a following crop.

The UAV has a camera, and as it flies over the field imagery is acquired. The UAV also has a GPS and inertial navigation system, which enables both the position of the UAV to be determined and the orientation of the camera also to be determined. From this information the footprint of an image on the ground can be determined, such that particular parts in that image, such as the example of the first type of weed, can be located with respect to absolute geospatial coordinates, and also the position of insects on the plants can be located. The imagery is also acquired at a resolution, either due to the camera having a very large CCD element, or using a zoom function or flying close to individual plants, that enables insects to be spotted against the plant foliage and even for the type of insect to be identified. The image data acquired by the camera is transferred to a processing unit external to the UAV. The processing unit image processes the images, using a machine learning algorithm based on an artificial neural network that has been trained on numerous image examples of different types of weeds, crop plans, and insects to determine if a plant being imaged is a crop plant, is a weed and if a weed to determine the type of weed, and whether there are insects on the plant and what insects are present. The processing unit then utilizes biodiversity settings and insect management settings, for this crop in this part of the world, and at the stage of its growth between seeding and harvesting, to determine if the plant should be sprayed with an insecticide and/or herbicide. The biodiversity setting and insect management settings are used by the processing unit to determine if a crop plant with particular insects should be sprayed with an insecticide or not, whether a weed with insects or not should be sprayed with an insecticide and/or herbicide. Also a decision can be made to spray a plant taking into account any associated conditions, such as a threshold number density per unit area.

Referring to the specific weeds shown and discussed with respect to FIG. 4, the processing unit determines that the crop plant with lots of aphids should be sprayed with an insecticide, and that the short detrimental plant with lots of aphids should be sprayed with both an insecticide to kill the aphids now and with a herbicide to kill the plant to stop aphids being attracted to the plant later in the season, and also to stop the weed from contaminating the harvest. The crop plant with a lot of aphids on it and one bee on it has been determined to require spraying with an insecticide, because on the basis of the insect management settings the benefit of the bee is offset by the detrimental effect of the aphids. Had there been fewer aphids on the plant, the decision would have been not to spray the plant. The beneficial tall weed with lots of bees on it, and fewer aphids is determined not to need spraying with any chemical. However, had the weed been particularly detrimental, contaminating the harvest, the decision would have been made to spray the plant with a herbicide only, killing the weed but sparing the bees and the aphid. Regarding the weed that later attracts ladybirds, but has an aphid on it now, the processing unit assesses when the ladybirds are anticipated to arrive at the crop from known data, and compares this with the duration of efficacy of the insecticide and determines to spray the weed now with the insecticide to kill the aphid. Had the ladybirds been expected to arrive earlier, then the decision to spray the plant may not have been made. Although, the probability for spraying varies with the number of aphids on the weed.

As described above, some weeds if present can help feed beneficial insects now and in the future, but can if in large enough quantities contaminate the harvest and/or be at such a number density per unit that they would be constitute too large a source of food for such beneficial insects. Thus, over a specific number density of weeds per unit area, which can vary between different types of weeds, the weed stops being of benefit with respect to insect management and starts to be of detrimental value with respect to insect management, and how such insect management relates to the final harvest. Therefore, the processing unit when it detects a weed of a particular type that is beneficial to beneficial insects it logs the type of weed and its location and does this for all weeds that are beneficial. If, however the number density of a particular type of weed goes above a threshold number density of that weed per unit area where the beneficial effects start to become detrimental, the processing unit determines that that a number of those weeds need to be sprayed with herbicide to kill those weeds as part of the overall insect management strategy. Threshold number densities for particular types of weeds can be 0.1 per square metre (such that in 10 square metres of crop one weed (or less) of this type is permitted), 0.02 per square metre (such that in 25 square metres of crop one weed (or less) of this type is permitted). Other threshold number densities of weeds can be used, such as 5, 1, 0.5, 0.05, 0.005, 0.001 per square metre and threshold values can be above or below these figures.

The processing unit thus generates a spray map of the locations of the plants, taking into account whether there are crop plants or weeds and whether there are pest insects or beneficial insects of those weeds and taking into account the type of weed and information relating to the present time in the harvest and how weeds could be beneficial to insects now and in the future.

A second robotic land vehicle then enters the field and using its own GPS and inertial navigation system moves to the locations of the crop plants and weeds that need to be sprayed, and using a first spray gun spray certain crop plants and certain weeds with an insecticide. The robotic land vehicle also uses a second spray gun to spray some of the weeds that have been sprayed with an insecticide with a herbicide, and sprays other weeds with the herbicide even when they were not sprayed with the insecticide, as part of the insect management process.

In another example of the UAV, which can be the UAV shown in FIG. 4, the UAV itself has the necessary processing power to detect and identify crop plants, weeds, and insects and determine on the basis of biodiversity settings and insect management settings which plants should be sprayed with an insecticide and/or herbicide. The UAV shown in FIG. 4, then has a chemical spot spray gun, which enables it to spray a herbicide on a weed and has a chemical spot spray gun, which enables it to spray an insecticide on a crop plant or weed. The insecticide can be sprayed on just parts of a plant at the location of the insects. The UAV does not then need to generate a spray map, but on the basis of the decision made can immediate use its insecticide spray gun and/or herbicide spray gun to spray a plant as required. As discussed in more with respect to FIG. 5, in another example, there can be no need to use a UAV and a robotic land vehicle can operate autonomously to acquire and process imagery to spray plants with a herbicide and/or insecticide including spraying just parts of plants if necessary.

FIG. 5 shows a plan view of a field with a crop. The majority of crop plants are not shown, but only several examples are shown, along with a number of weeds, with insects being shown on some of the crop plants and on some of the weeds. A robotic land vehicle with a camera and processing unit and a herbicide spray gun and an insecticide spray gun, linked to respective chemical reservoirs, is moving around the crop field. The robotic land vehicle is carrying out insect management. It has done so for roughly three quarters of the field, and is now moving on to insect management in the top right hand side quarter of the field. Weeds that are to be sprayed with a herbicide are shown surrounded by a large solid triangle, and plants whether crop plants or weeds that are to be sprayed with a insecticide are surrounded by a hashed circle. The following is shown in the top right hand side of the field: a number of crop plants (represented as solid ellipses) have mainly bees and are not to be sprayed; a number of crop plants (represented as open ellipses) have mainly aphids and are to be sprayed with an insecticide; a beneficial weed (represented as a solid small triangle) has mainly bees and is generally not to be sprayed, however the number density of this weed is too high and several of these weeds are to be sprayed with a herbicide to bring their number density down below a threshold number density; a beneficial weed (shown as an open triangle) that attracts predatory insects later in the season has lots of aphids on it and is generally to be sprayed with an insecticide, however the number density of this weed is again too high and one of the weeds is to be sprayed with a herbicide as well in order to reduce its number density below a threshold value for this weed that is different to the threshold value for the previous weed; another beneficial weed (shown as an open square) attracts predatory insects later in the season has only a couple of aphids on it and to minimise chemical use is not sprayed; a detrimental weed (shown as a solid square) has lots of aphids on it and is to be sprayed with an insecticide and herbicide; and a beneficial weed that feeds bees (shown as a star) has no insects on it at the moment and is not to be sprayed.

The above has been described with respect to aphids, bees and ladybirds, however other pests, and beneficial insects can be managed in the above described manner through the targeted use of insecticides and/or herbicides on the basis of image processing.

Image processing to enable analysis to determine a weed type.

A specific example of how an image is processed, and determined to be suitable for image processing in order that a type of weed can be determined is now described:

1. A digital image—in particular a colored image—of a weed is captured.

2. Areas with a predefined color and texture within the digital image are contoured within a boundary contour. Typically, one may expect one contoured area from one weed plant. However, there may also be more than one contoured area from different, potentially not connected leafs, from two weed plants, or the like.—Such a detection or determining process detects boundaries of green areas of the digital image. During this process at least one contoured area—e.g., one or more leafs, as well as one or more weed plants—may be built comprising pixels relating to the weed within a boundary contour. However, it may also be possible, that the digital image has captured more than one leaf and/or the stem. Consequently, more than one contoured area may be determined.

3. Determining if the boundary contour covers a large enough area, and determining a sharpness (e.g. degree of focus) of the image data within the boundary contour. This firstly ensures that there will be sufficient image data upon which a determination can be made as to the type of weed, and secondly determines that a minimum quality of the digital image will be satisfied in order that the type of weed can be made.

4. If both criteria in 3) are satisfied, the digital image, and specifically that within the boundary contour is sent to the processing unit for image analysis by the artificial neural network to determine the type of weed as described above.

5. Similar image processing steps are used to determine one crop plant from another crop plant, and used to detect insects and to identify the type of insect.

In another exemplary embodiment, a computer program or computer program element is provided that is characterized by being configured to execute the method steps of the method according to one of the preceding embodiments, on an appropriate apparatus or system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

Figure 6:
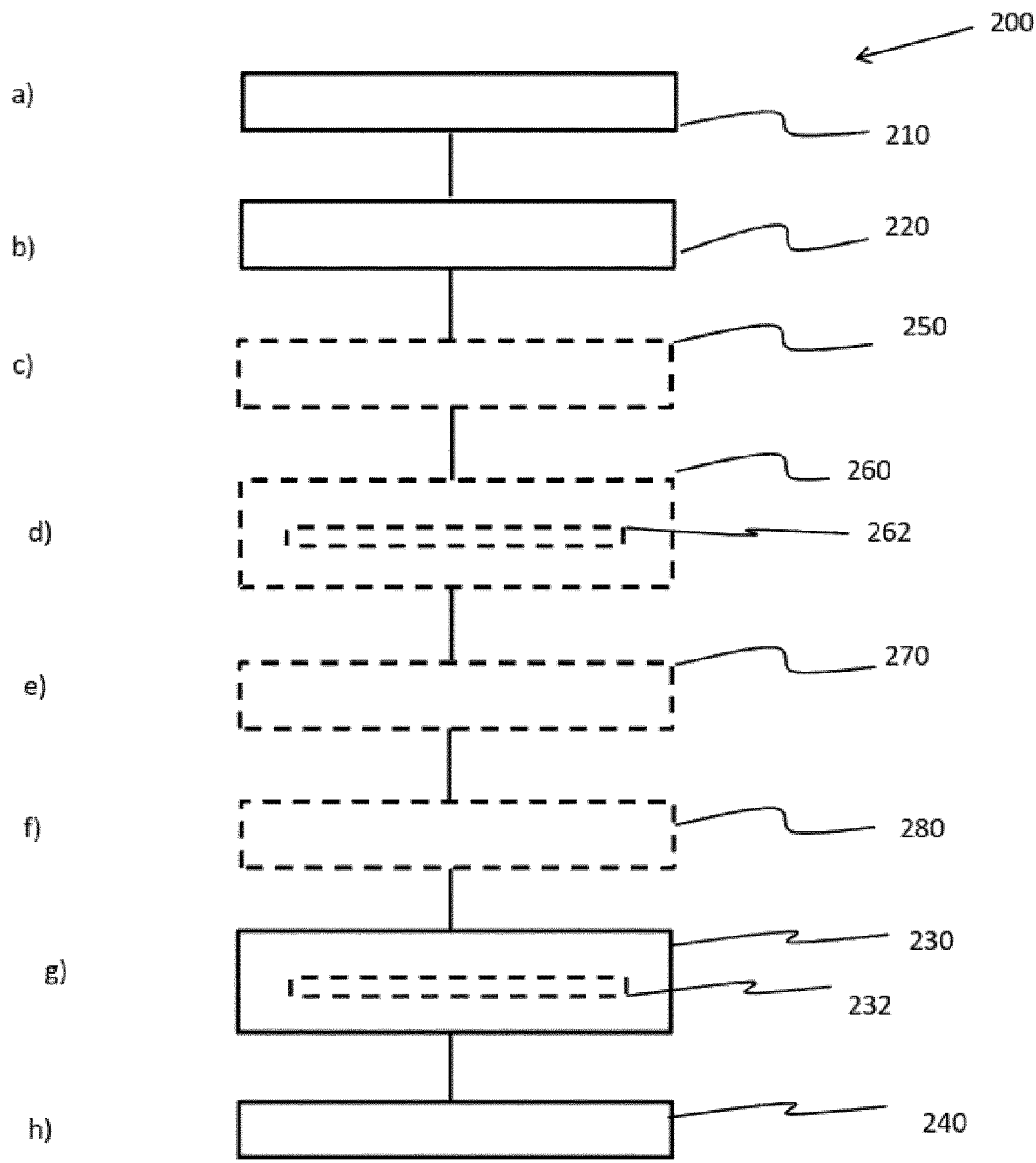
FIG. 6 shows another method for plant management.

FIG. 6 shows a method 200 for plant management, particularly weed management, in its basic steps, where solid blocks indicate essential steps and dashed blocks indicate steps that are optional. The method 200 comprises:

in a providing step 210, also referred to as step a), providing a processing unit with at least one image of a field;

in an analyzing step 220, also referred to as step b), analysing by the processing unit the at least one image to determine that a weed is present;

in a determining step 230, also referred to as step g), determining by the processing unit if the weed is to be controlled by a weed control technology or is not to be controlled by the weed control technology; and in an outputting step 240, also referred to as step h), outputting information by an output unit that is useable to activate the weed control technology, if the determination is made that the weed is to be controlled by the weed control technology.

In an example, step g) comprises step g1) applying 232 at least one biodiversity setting and/or at least one agronomic rule.

In an example, the method comprises step c) determining 250 a type of weed for the weed that is present, and wherein in step g1) the at least one biodiversity setting and/or at least agronomic rule comprises a list of at least one weed that is to be controlled and/or wherein in step g1) the at least one biodiversity setting and/or at least agronomic rule comprises a list of at least one weed that is not to be controlled.

In an example, the method comprises step d) analysing 260 the at least one image to determine that a number of weeds in an area are present, and wherein in step g1) the at least one biodiversity setting and/or at least one agronomic rule comprises a threshold number of weeds per unit area, and wherein in step g) the determination that the weed is to be controlled comprises the number of weeds divided by the area exceeding the threshold number of weeds per unit area.

In an example, step d) comprises analysing 262 the at least one image to determine that a number of weeds of a particular type in an area are present, and wherein in step g1) the at least one biodiversity setting and/or at least one agronomic rule comprises a threshold number of weeds of that type per unit area, and wherein in step g) the determination that the weed is to be controlled comprises the number of weeds of a particular type divided by the area exceeding the threshold number of weeds of that type per unit area.

In an example of the method, when the type of weed is on the list of weeds that are not to be controlled, the type of weed is controlled when a number of weeds of that type divided by the area exceeds the threshold number of weeds of that type per unit area.

In an example, the method comprises step e) analysing 270 the at least one image to determine a location of the weed in the at least one image.

In an example, the at least one image was acquired by at least one camera, and wherein the method comprises step f) providing 280 at least one geographical location associated with the at least one camera when the at least one image was acquired.

In an example of the method, analysis of the at least one image comprises utilisation of a machine learning algorithm.

The apparatus, system and method for weed management are now described in more detail with respect to FIGS. 4 and 5.

Figure 7:
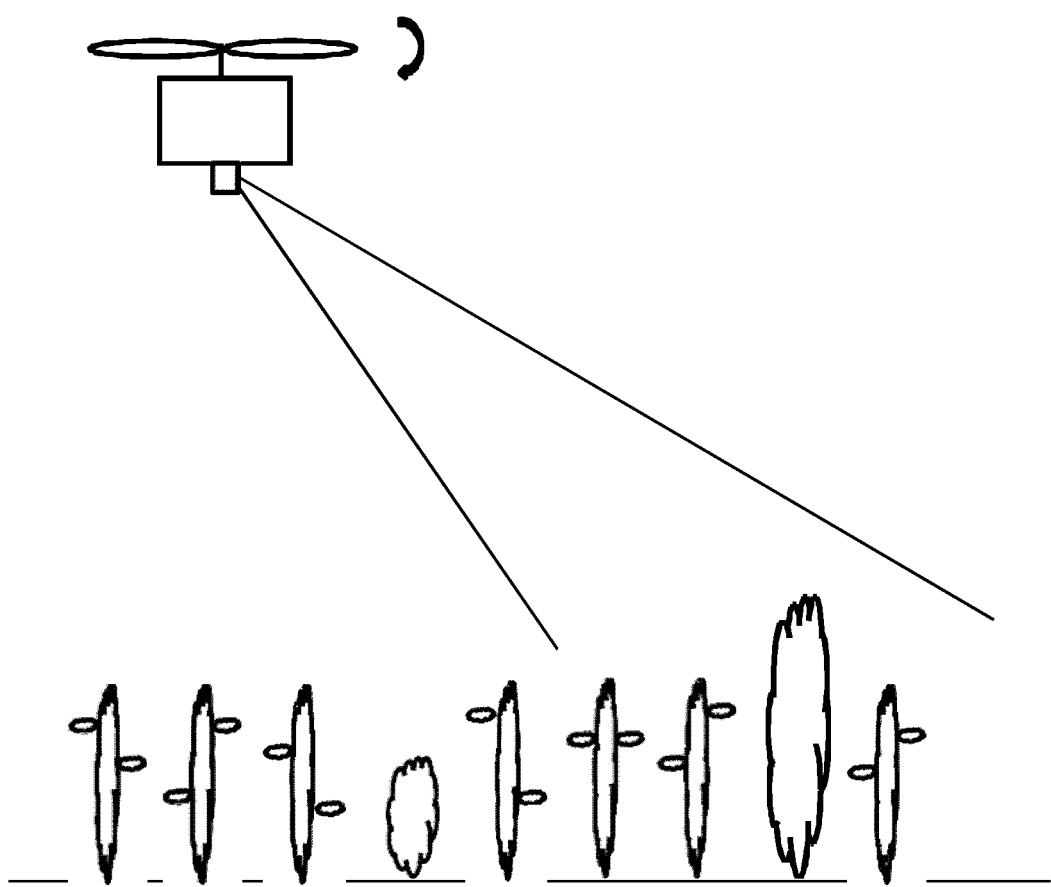
FIG. 7 shows a schematic representation of a robotic vehicle acquiring imagery of a field.

FIG. 7 shows an unmanned aerial vehicle (UAV) flying over a field containing a crop. In the crop there are also a number of weeds, with two particular and different weed types shown in FIG. 7. One weed type, the taller weed shown in FIG. 7 is particularly virulent, produces numerous seeds and can significantly affect the crop yield. This weed should not be tolerated in the field containing this crop. However, a second type of weed shown in FIG. 7 as the shorter weed, can be beneficial to the overall biodiversity for the crop in the field, with the proviso that the number density of this weed per unit area is below a threshold value. There is also a third type of weed, not shown in FIG. 7 that can also be tolerated but at a different number density per unit area to the second weed type.

The UAV has a camera, and as it flies over the field imagery is acquired. The UAV also has a GPS and inertial navigation system, which enables both the position of the UAV to be determined and the orientation of the camera also to be determined. From this information the footprint of an image on the ground can be determined, such that particular parts in that image, such as the example of the first type of weed, can be located with respect to absolute geospatial coordinates. The image data acquired by the camera is transferred to a processing unit external to the UAV. The processing unit image processes the images, using a machine learning algorithm based on an artificial neural network that has been trained on numerous image examples of different types of weeds, to determine if a weed is present and also to determine the type of weed. The processing unit then utilizes biodiversity settings, for this crop in this part of the world, and at the stage of its growth between seeding and harvesting. The biodiversity settings are used by the processing unit to determine if specific weeds cannot be tolerated, or whether other specific weeds can be tolerated, and if so if there are any associated conditions, such as a threshold number density per unit area. Referring to the specific weeds shown and discussed with respect to FIG. 4, the processing unit determines that all detected examples of the first weed type need to be destroyed. The processing unit determines that the second weed type can be permitted at a number density below 0.1 per square metre (such that in 10 square metres of crop one weed (or less) of this type is permitted). The processing determines that the third weed type can be permitted at a number density below 0.02 per square metre (such that in 25 square metres of crop one weed (or less) of this type is permitted). Other threshold number densities of weeds can be used, such as 5, 1, 0.5, 0.05, 0.005, 0.001 per square metre and threshold values can be above or below these figures. The processing unit generates a weed map of the locations of the weed that need to be destroyed. A second robotic land vehicle then enters the field and using its own GPS and inertial navigation system moves to the locations of the weeds that needs to be destroyed, and using a mechanical implement to extract the weed from the ground.

In another example of the UAV, which can be the UAV shown in FIG. 7, the UAV itself has the necessary processing power to detect and identify weeds, and determine on the basis of biodiversity settings which weeds, should be destroyed. The UAV shown in FIG. 4, then has a chemical spot spray gun, which enables it to spray a herbicide on a weed. The UAV does not then need to generate a weed map, but on the basis of the weed type detected, such as the first weed type, it immediate descends to the weed and sprays it with the herbicide. However, for weeds of the second and third type the UAV keeps a log of the locations of the weeds of this type that it has determined can survive, because the number density is below the respective threshold value. Thus, when it detects and identifies a new example of the second or third type of weed, it can use the stored locations of the previously detected and not destroyed examples, to determine if the new example of the weed will push the local number density above the threshold, upon which the UAV descends and sprays the weed, or can survive in which case it logs its position and carries on interrogating, and weed managing, the field. It is to be noted that the robotic land vehicle can also have a camera and processing unit, and carry out the real-time weed control in a similar manner to that just described for the UAV.

In another example, the UAV simply detects a weed as being a plant that is not a crop plant, and destroys all but a number of these weeds to leave a certain number per unit area in the crop or a certain number in the field. For example, a determination can be made to destroy nine out of every ten weeds (or 99 out of 100) detected to leave one tenth (or 1%) of the original weeds in the field, irrespective of the weed or to leave 0.1 weed per square metre in the field. Thus in this manner, there is no need to identify the type of weed or to use biodiversity settings.

Figure 8:
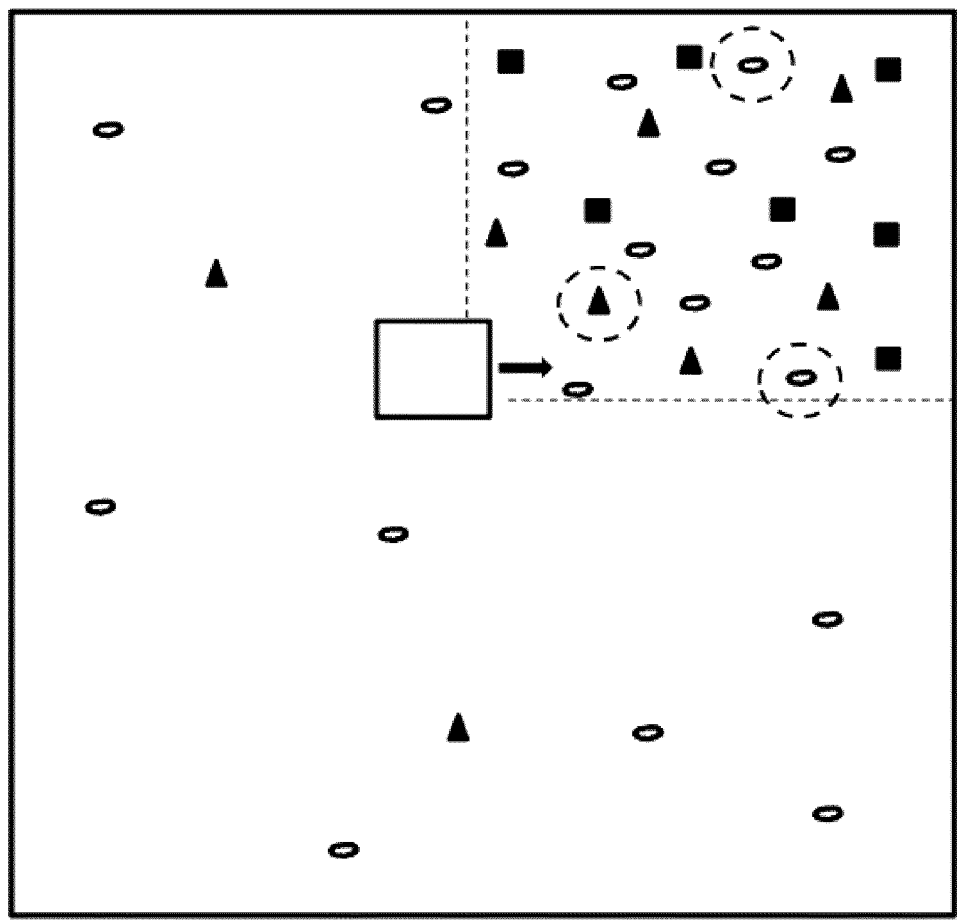
FIG. 8 shows a schematic representation of a field with weeds, where a portion of the field has not yet been controlled by a robotic vehicle.

FIG. 8 shows a plan view of a field with a crop. The crop itself is not shown. In the crop, there is the first type of weed shown as squares, which cannot be permitted. The second type of weed is shown as ovals, and the third type of weed is shown as triangles. A robotic land vehicle is shown, which is gradually moving around the field, acquiring imagery of the crop and weeds, detecting and identifying and on the basis of biodiversity settings is either destroying weeds or permitting some examples of weeds to survive. The robotic land vehicle is carrying out this weed management in real time, in a similar fashion to that described above for the UAV and sprays weeds with a herbicide to kill then if necessary. The robotic land vehicle has already managed the weeds in slightly more than three quarters of the field. It has destroyed all examples of the first type of weed, but has let a certain number of the first and second weed types to survive, with these shown in the "weed managed" part of the field. In the top right hand corner of the field, is shown a part of the crop that has yet not been weed managed. In this part of the field there are examples of the first, second and third types of weed. As the robotic land vehicle enters this part of the field, it images and detects and identifies weeds, and on the basis of biodiversity settings sprays them with the herbicide or not. The specific examples of weeds that will be detected, identified and permitted to survive are shown encircled with a dashed line. Having weed managed the field, the remaining weeds will not negatively impact on the yield of the crop, but provide beneficial biodiversity effects through for example, the attraction of insects, the fixing of beneficial chemicals in their roots, an increase in the crop size as a flower strip is note required at the edge of the field, and lead to a reduction in the amount of herbicide used and generally provide for positive public engagement with farming practices.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus (10) for plant management, comprising:
   an input unit (20);
   a processing unit (30); and
   an output unit (40);
      wherein, the input unit is configured to provide the processing unit with at least one image of a field;
      wherein, the processing unit is configured to analyse the at least one image to determine information relating to a plant that is present;
      wherein, the processing unit is configured to determine if the plant is to be controlled or is not to be controlled by a plant control technology based on the information relating to the plant, wherein the determination if the plant is to be controlled comprises application of at least one biodiversity setting and/or at least one agronomic rule, the at least one biodiversity setting and/or at least agronomic rule comprising a list of at least one weed that is to be controlled and/or a list of at least one weed that is not to be controlled, wherein, when a type of weed is on the list of weeds that are not to be controlled, the type of weed is to be controlled when a number of weeds of that type divided by the area of the field exceeds the threshold number of weeds of that type per unit area; and
      wherein, if the determination is made that the plant is to be controlled by the plant control technology, the output unit is configured to output information useable to activate the plant control technology.

2. Apparatus according to claim 1,
   wherein the processing unit is configured to analyse the at least one image to identify the plant, and wherein the information relating to the plant comprises the identity of the plant.

3. Apparatus according to claim 1,
   wherein the processing unit is configured to analyse the at least one image to determine if the plant is a specimen of a crop grown in the field or if the plant is a weed; and
   wherein the information relating to the plant comprises the determination of the plant belonging to the crop or the determination that the plant is a weed.

4. Apparatus according to claim 3,
   wherein if the determination is made that the plant is a weed, the processing unit is configured to analyse the at least one image to determine a type of weed for the plant; and
   wherein the information relating to the plant comprises the determined type of weed.

5. Apparatus according to claim 4,
   wherein the processing unit is configured to analyse the at least one image to determine a number of weeds, in particular of that type, in an area of the field; and
   wherein the information relating to the plant comprises a determination if the number of weeds of that type divided by the area exceeds a threshold number of weeds of that type per unit area.

6. Apparatus according to claim 1,
wherein the processing unit is configured to analyse the at least one image to detect at least one insect on the plant; and
wherein the information relating to the plant comprises the detection of the at least one insect.

7. Apparatus according to claim 6,
wherein the processing unit is configured to analyse the at least one image to determine a type of insect for an insect of the at least one insect detected;
wherein the information relating to the plant comprises the type of insect,
wherein in particular the processing unit is configured to analyse the at least one image to determine a number of insects of that type on the plant, and the information relating to the plant comprises the determined number of insects of that type on the plant exceeding a threshold number, and
wherein further in particular the processing unit is configured to analyse the at least one image to determine a number of plants in an area of the field that have that type of insect, and the information relating to the plant comprises a determination if the number of plants having that type of insect in that area divided by the area exceeds a threshold number.

8. Apparatus according to claim 1,
wherein the at least one image was acquired by at least one camera; and
wherein the input unit is configured to provide the processing unit with at least one geographical location associated with the at least one camera when the at least one image was acquired.

9. Apparatus according to claim 1,
wherein analysis of the at least one image comprises utilisation of a machine learning algorithm.

10. A system (100) for plant management, comprising:
at least one camera (110);
an apparatus (10) for plant management according to claim 1; and
at least one plant control technology (120);
wherein, the at least one camera is configured to acquire the at least one image of the field;
wherein, the at least one plant control technology is mounted on a vehicle (130);
and
wherein, the apparatus is configured to activate the at least one plant control technology at a location of the plant if the determination is made that the plant is to be controlled.

11. System according to claim 10,
wherein the apparatus is mounted on the vehicle; and
wherein the at least one camera is mounted on the vehicle.

12. A method (200) for plant management, comprising:
a) providing (210) a processing unit with at least one image of a field;
b) analysing (220) by the processing unit the at least one image to determine information relating to a plant that is present;
c) determining (230) by the processing unit if the plant is to be controlled or is not to be controlled by a plant control technology based on the information relating to the plant, wherein determining if the plant is to be controlled comprises applying at least one biodiversity setting and/or at least one agronomic rule, the at least one biodiversity setting and/or at least agronomic rule comprising a list of at least one weed that is to be controlled and/or a list of at least one weed that is not to be controlled, wherein, when a type of weed is on the list of weeds that are not to be controlled, the type of weed is to be controlled when a number of weeds of that type divided by the area of the field exceeds the threshold number of weeds of that type per unit area; and
d) outputting (240) information by an output unit that is useable to activate the plant control technology if the determination is made that the plant is to be controlled.

13. A computer program element for controlling an apparatus which when executed by a processor is configured to carry out the method of claim 12.

\* \* \* \* \*